(12) United States Patent
Kim

(10) Patent No.: US 11,184,771 B1
(45) Date of Patent: Nov. 23, 2021

(54) ELECTRONIC APPARATUS AND METHOD OF SELECTIVELY APPLYING SECURITY MODE IN MOBILE DEVICE

(71) Applicant: Seungman Kim, McLean, VA (US)

(72) Inventor: Seungman Kim, McLean, VA (US)

( * ) Notice: Subject to any disclaimer, the term of this patent is extended or adjusted under 35 U.S.C. 154(b) by 270 days.

(21) Appl. No.: 16/679,181

(22) Filed: Nov. 9, 2019

Related U.S. Application Data

(60) Division of application No. 16/402,275, filed on May 3, 2019, now Pat. No. 10,511,975, which is a division
(Continued)

(51) Int. Cl.
| | |
|---|---|
| *H04W 52/02* | (2009.01) |
| *H04M 1/673* | (2006.01) |
| *H04M 1/67* | (2006.01) |
| *H04W 12/08* | (2021.01) |
| *H04W 12/06* | (2021.01) |
| *H04M 1/72412* | (2021.01) |
| *H04M 1/72448* | (2021.01) |
| *H04M 1/72463* | (2021.01) |

(Continued)

(52) U.S. Cl.
CPC ............ *H04W 12/08* (2013.01); *H04M 1/67* (2013.01); *H04M 1/673* (2013.01); *H04M 1/72412* (2021.01); *H04M 1/72448* (2021.01); *H04M 1/72463* (2021.01); *H04M 1/72469* (2021.01); *H04W 12/06* (2013.01); *H04W 52/0251* (2013.01); *H04W 52/0274* (2013.01); *H04M 1/66* (2013.01); *H04M 1/72451* (2021.01); *H04M 1/72457* (2021.01); *Y02D 30/70* (2020.08)

(58) Field of Classification Search
None
See application file for complete search history.

(56) References Cited

U.S. PATENT DOCUMENTS

| | | |
|---|---|---|
| 5,731,801 A | 3/1998 | Fukuzaki |
| 8,233,789 B2 | 7/2012 | Brunner |
| | (Continued) | |

FOREIGN PATENT DOCUMENTS

| | | |
|---|---|---|
| EP | 2364004 A1 | 9/2011 |
| WO | 2004070591 A1 | 8/2004 |
| | (Continued) | |

OTHER PUBLICATIONS

WEB: https://support.apple.com/en-US/HT204380, Apple, iOS7, Face Time, 7 pages.
(Continued)

*Primary Examiner* — Idowu O Osifade
(74) *Attorney, Agent, or Firm* — Seungman Kim; EIPG

(57) ABSTRACT

A computer-readable medium contains computer-readable codes as a program to execute a method of a mobile device, and the method includes unlocking the mobile device for the user to access a normal mode according to a password input from the user in a security check process of a security mode, and unlocking the mobile device for the user to access the normal mode according to an exceptional condition of the security mode, wherein the exceptional condition comprises a wireless communication, in which the mobile device wirelessly communicates with the external network, and an area condition, in which the mobile device is located.

34 Claims, 13 Drawing Sheets

Related U.S. Application Data of application No. 16/166,078, filed on Oct. 20, 2018, now Pat. No. 10,299,133, which is a division of application No. 16/127,286, filed on Sep. 11, 2018, now Pat. No. 10,149,164, which is a continuation of application No. 15/984,375, filed on May 20, 2018, now Pat. No. 10,085,151, which is a continuation of application No. 15/972,135, filed on May 5, 2018, now Pat. No. 10,111,098, which is a division of application No. 15/853,870, filed on Dec. 25, 2017, now Pat. No. 9,973,929, which is a continuation of application No. 15/297,069, filed on Oct. 18, 2016, now Pat. No. 10,064,056, which is a continuation-in-part of application No. 14/181,728, filed on Feb. 17, 2014, now Pat. No. 9,509,822.

(51) Int. Cl.
*H04M 1/72469* (2021.01)
*H04M 1/66* (2006.01)
*H04M 1/72451* (2021.01)
*H04M 1/72457* (2021.01)

(56) References Cited

U.S. PATENT DOCUMENTS

| | | | |
|---|---|---|---|
| 8,245,143 B2 | 8/2012 | Yach et al. | |
| 8,276,085 B2 | 9/2012 | Sherwani | |
| 8,279,184 B2 | 10/2012 | Lowles et al. | |
| 8,280,363 B2 | 10/2012 | Yoo | |
| 8,284,179 B2 | 10/2012 | Bernstein | |
| 8,284,211 B2 | 10/2012 | Darsu et al. | |
| 8,302,033 B2 | 10/2012 | Matas et al. | |
| 8,358,321 B1 | 1/2013 | Weidner | |
| 8,600,056 B2 | 12/2013 | Heurtaux et al. | |
| 8,600,060 B2 | 12/2013 | Priestley et al. | |
| 8,600,120 B2 | 12/2013 | Gonion et al. | |
| 8,613,070 B1 | 12/2013 | Borzycki et al. | |
| 8,626,125 B2 | 1/2014 | Lee et al. | |
| 8,627,433 B2 | 1/2014 | Conner et al. | |
| 8,627,438 B1 | 1/2014 | Bhimanaik | |
| 8,646,069 B2 | 2/2014 | Kim et al. | |
| 8,649,759 B2 | 2/2014 | Scott et al. | |
| 8,665,238 B1 | 3/2014 | Gossweiler et al. | |
| 8,751,065 B1 | 6/2014 | Kato | |
| 8,826,178 B1 | 9/2014 | Zhang | |
| 8,994,499 B2 | 3/2015 | Zhao et al. | |
| 9,076,029 B2 | 7/2015 | Free | |
| 2004/0203895 A1 | 10/2004 | Balasuriya | |
| 2006/0128305 A1 | 6/2006 | Delalat | |
| 2007/0197261 A1 | 8/2007 | Humbel | |
| 2007/0271512 A1 | 11/2007 | Knight et al. | |
| 2008/0070503 A1 | 3/2008 | Bang | |
| 2008/0262839 A1 | 10/2008 | Nonaka et al. | |
| 2008/0307360 A1 | 12/2008 | Chaudhri | |
| 2009/0011796 A1 | 1/2009 | Ormson | |
| 2009/0160792 A1 | 6/2009 | Morohoshi et al. | |
| 2009/0267912 A1 | 10/2009 | Wada | |
| 2009/0271704 A1 | 10/2009 | Cohen | |
| 2011/0070864 A1* | 3/2011 | Karam | G06F 21/34 |
| | | | 455/411 |
| 2011/0098087 A1 | 4/2011 | Tseng | |
| 2011/0161869 A1 | 6/2011 | Yoo | |
| 2012/0009896 A1 | 1/2012 | Bandyopadhyay et al. | |
| 2012/0032979 A1 | 2/2012 | Blow et al. | |
| 2012/0081392 A1 | 4/2012 | Arthur | |
| 2012/0162261 A1 | 6/2012 | Kim et al. | |
| 2012/0174021 A1 | 7/2012 | Dharawat | |
| 2012/0179994 A1 | 7/2012 | Knowlton | |
| 2012/0251993 A1 | 10/2012 | Chidambaran | |
| 2012/0297339 A1 | 11/2012 | Ito | |
| 2013/0050120 A1 | 2/2013 | Takahashi et al. | |
| 2013/0076655 A1 | 3/2013 | Sipal et al. | |
| 2013/0151963 A1 | 6/2013 | Costenaro et al. | |
| 2013/0202161 A1 | 8/2013 | Shor et al. | |
| 2013/0215060 A1 | 8/2013 | Nakamura et al. | |
| 2013/0219345 A1 | 8/2013 | Saukko et al. | |
| 2013/0219454 A1 | 8/2013 | Hewinson | |
| 2013/0297675 A1 | 11/2013 | Li | |
| 2013/0298024 A1 | 11/2013 | Rhee et al. | |
| 2014/0022285 A1 | 1/2014 | Stovicek et al. | |
| 2014/0165187 A1 | 6/2014 | Kim et al. | |
| 2014/0203073 A1 | 7/2014 | Braun | |
| 2014/0232633 A1* | 8/2014 | Shultz | H04W 12/06 |
| | | | 345/156 |
| 2014/0237378 A1 | 8/2014 | Gonen | |
| 2014/0283135 A1 | 9/2014 | Shepherd et al. | |
| 2014/0330569 A1 | 11/2014 | Kolavennu et al. | |
| 2014/0366164 A1 | 12/2014 | Hoefgen et al. | |
| 2015/0051913 A1 | 2/2015 | Choi | |
| 2015/0218872 A1 | 8/2015 | Breed | |
| 2015/0223891 A1 | 8/2015 | Miller et al. | |
| 2015/0358088 A1 | 12/2015 | Eim et al. | |
| 2016/0109954 A1 | 4/2016 | Harris et al. | |
| 2016/0142407 A1 | 5/2016 | Chun et al. | |
| 2016/0155426 A1 | 6/2016 | Grunn et al. | |
| 2017/0076077 A1 | 3/2017 | Zhao et al. | |
| 2019/0020801 A1 | 1/2019 | Shultz | |
| 2019/0174429 A1 | 6/2019 | Schillings et al. | |

FOREIGN PATENT DOCUMENTS

| | | | |
|---|---|---|---|
| WO | 2006090899 A1 | 8/2006 | |
| WO | 2012049942 | 4/2012 | |
| WO | 2012093784 A2 | 7/2012 | |

OTHER PUBLICATIONS

WEB: https://lifehacker.com/unlock-with-wifi-disables-your-password-protected-locks-5788727, Lifehaker, Disabling Password, 1 page.
Notification of transmittal of the international search report and the written opinion (12 pages) dated on Nov. 2015.

* cited by examiner

ELECTRONIC APPARATUS AND METHOD OF SELECTIVELY APPLYING SECURITY MODE IN MOBILE DEVICE

CROSS-REFERENCE TO RELATED APPLICATIONS

This U.S. non-provisional patent application is a divisional application under 35 U.S.C. § 120 of a U.S. non-provisional application Ser. No. 16/402,275 filed May 3, 2019, now U.S. Pat. No. 10,511,975, which is a divisional application of a U.S. non-provisional application Ser. No. 16/166,078 filed Oct. 20, 2018, now U.S. Pat. No. 10,299,133, which is a divisional application of a U.S. non-provisional application Ser. No. 16/127,286 filed on Sep. 11, 2018, now U.S. Pat. No. 10,149,164, which is a continuation application of a U.S. non-provisional application Ser. No. 15/984,375 filed on May 20, 2018, now U.S. Pat. No. 10,085,151 which is a continuation application of a U.S. non-provisional application Ser. No. 15/972,135 filed on May 5, 2018, now U.S. Pat. No. 10,111,098, which is a divisional application of a U.S. non-provision patent application Ser. No. 15/853,870 filed on Dec. 25, 2017, now U.S. Pat. No. 9,973,929, which is a continuation application of U.S. non-provisional application Ser. No. 15/297,069, filed on Oct. 18, 2016, now U.S. Pat. No. 10,064,056, which is a continuation-in-part application of U.S. non-provisional patent application Ser. No. 14/181,728, filed on Feb. 17, 2014, now U.S. Pat. No. 9,509,822, in the U.S. Patent and Trademark Office, the entire contents of which are hereby incorporated by reference.

BACKGROUND OF THE INVENTIVE CONCEPT

1. Field of the Inventive Concept

The present inventive concept relates to an electronic apparatus and method of selectively applying a security mode in a mobile device.

2. Description of the Related Art

A conventional electronic mobile device, for example, a cellular phone, is set to a security mode or a non-security mode. When the set security mode is set, a user has to input a security code by enter a password, an image, or a geniture though a user interface unit. That is, a user has to input the security code every time to access the mobile device set with the security mode.

Even if a user is in a security safe zone, the user has to enter the security code previously set in the security mode. In order for the user to avoid inconvenience in the security safe zone, a user has to disable the security mode to avoid any inconvenience to enter the security code, and then later enable the security mode.

Moreover, since the mobile device is accessed only with the security code set in the security mode, no one is allowed to access the mobile device without the set security code. That is, a person having a high priority or authorization to access the mobile device cannot access the mobile device of a person having a lower priority or authorization.

SUMMARY OF THE INVENTIVE CONCEPT

The present inventive concept provides an electronic apparatus to selectively apply a security mode in a mobile device.

The present inventive concept provides a method of selectively applying a security mode in a mobile device.

The present inventive concept provides a computer readable medium to contain computer readable codes as a program to execute a method of selectively applying a security mode in a mobile device.

Additional features and utilities of the present inventive concept will be set forth in part in the description, which follows and, in part, will be obvious from the description, or may be learned by practice of the present inventive concept.

The foregoing and/or other features and utilities of the present inventive concept may be achieved by providing a non-transitory computer-readable medium containing computer-readable codes as a program to execute a method of a mobile device which is configured to photograph an object, the method including displaying a photographing object on a panel of a display unit, receiving an input from a user and wirelessly communicating with an external network to transmit or receive a data signal to correspond to a menu or function of the mobile device, unlocking the mobile device for the user to access a normal mode according to a password input from the user in a security check process of a security mode, and unlocking the mobile device for the user to access the normal mode according to an exceptional condition of the security mode, wherein the exceptional condition comprises a wireless communication, in which the mobile device wirelessly communicates with the external network, and an area condition, in which the mobile device is located.

The method may further includes determining whether the mobile device is in the exceptional condition, unlocking the mobile device according to the determination that the mobile device is in the exceptional condition, and unlocking the mobile device according to the password of the security check process according to the determination that the mobile device is not in the exceptional condition.

The method may further include requiring setting the password before the exceptional condition is set.

The method may further includes receiving a user input by using a switch of the interface, and displaying the normal mode according to the user input of the interface.

The method may further include displaying a user menu to set password of the security check process of the security mode during the normal mode, at a user-finger reachable area of the panel of the display unit such that a finger of a user hand holding the mobile device reaches the user menu.

The method may further include displaying a user menu to set the exceptional condition of the security mode during the normal mode, at a user-finger reachable area of the panel of the display unit such that a finger of a user hand holding the mobile device reaches the user menu.

The method may further include displaying a user menu including a first sub-user menu to set the wireless communication condition and a second sub-user menu to set the area condition, and disposing at least one of the first sub-user menu and the second sub-user menu, at a user-finger reachable area of the panel of the display unit such that a finger of a user hand holding the mobile device reaches the at least one of the first sub-user menu and the second sub-user menu.

The method may further include displaying a state section and a user menu section on the panel of the display unit, displaying a user menu to set the exceptional condition in the user menu section, and displaying the user menu at a user-finger reachable area of the user menu section on the panel of the display unit such that a finger of a user hand holding the mobile device reaches the user menu.

The interface may include a switch to change the mobile device from the power saving mode to the normal mode, and the method may further include changing the mobile device from the power saving mode to the normal mode according to at least one of an operation of the switch, the password of the security check process of the security mode, and the exceptional condition of the security mode.

The area condition may be associated with the data signal of the external network.

The external network may comprise a network of an external device located in an area of the area condition.

The method may further include recognizing that the mobile device is in the area condition according to the wireless communication condition with the external network which is located in the area of the area condition.

The area condition may comprise a home location.

The method may further include displaying a diagram, and displaying at least one of a line or an environment to define an area of the area condition on the diagram.

The method may further include requiring the password input by user to set an area of the area condition or to change the set area of the area condition.

The method may further include requiring the wireless communication condition to set an area of the area condition.

The wireless communication condition may include a communication method between the mobile device and the external network.

The external network may include at least one network of a WIFI device, a mobile station, another mobile device, a home appliance, a vehicle, and a medical device.

The method may further include displaying one or more external networks, and allowing the user to select at least one of the displayed one or more external networks as the wireless communication condition.

The exceptional condition may further include a time condition, in which the mobile device is at a predetermined time, and a signal condition in which the mobile condition receives a predetermined signal, and the method may further include selectively applying the password of the security check process and the exceptional condition to change the mobile device from the power saving mode to the normal mode according to the wireless communication condition and at least one of the area condition, the time condition, and the signal condition.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
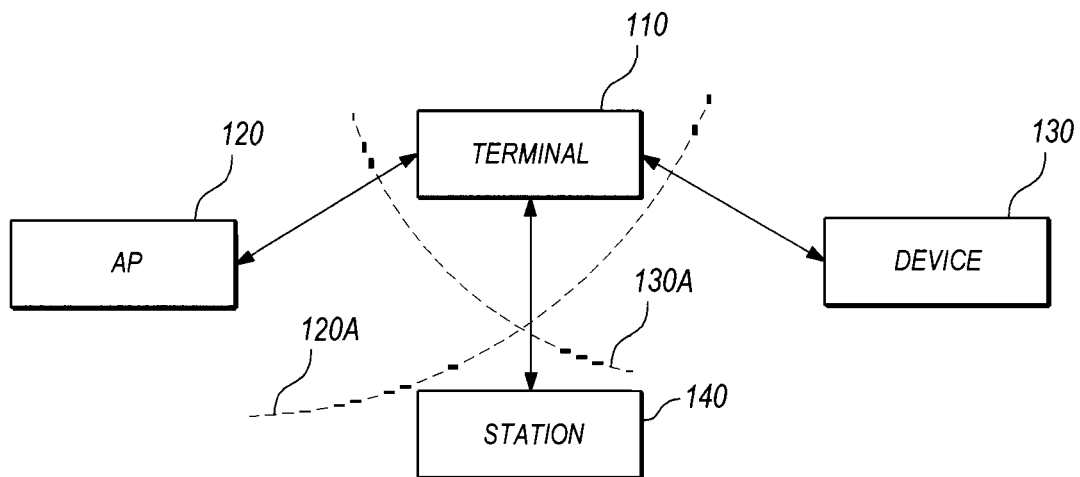
FIG. 1 is a block diagram illustrating an electronic terminal to communicate with external devices according to an embodiment of the present inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

FIG. 1 illustrates an electronic terminal apparatus 110 to communicate with one or more external apparatuses according to an embodiment of the present inventive concept. The electronic terminal apparatus 110 may be a computer apparatus, a portable personal computer, a mobile electronic device, a mobile phone, a mobile tablet apparatus, a mobile tablet computing apparatus, an audio or video recording and/or reproducing apparatus, a photographing apparatus, a communication device, etc.

The external apparatus may be an access point (AP) 120 such as a wireless access point device to connect to a wired network using WiFi, WiFi direct, or related standards, a device 130 such as a Bluetooth device or radio frequency identification (RFID) device, etc, and a station for wireless communication such as a carrier service station for 4G, LTE, etc. However, the present general inventive concept is not limited thereto. It is possible that the external apparatus may be another electronic apparatus. It is also possible that the external apparatus may be an apparatus to communicate with the terminal 110 to transmit and receive data therebetween, and such an apparatus may be a home appliance, such as a refrigerator or air conditioner.

The terminal 110 may be disposed within an area defined by a line 120a distanced from the AP 120 or an area defined by a line 130a distanced from the device 130. The terminal 110 may communicate with the AP 120 using the AP-related technology when being disposed within the area defined by the line 120a, and may also communicate with the device using the device-related technology when being disposed within the area defined by the line 130a.

The terminal 110 may have menus and/or functions to correspond to data (signal) of the AP 120, the device 130, and the station 140. The terminal 110 may have menus and functions to correspond to data (signal) stored in a storage unit of the terminal 110.

Figure 2:
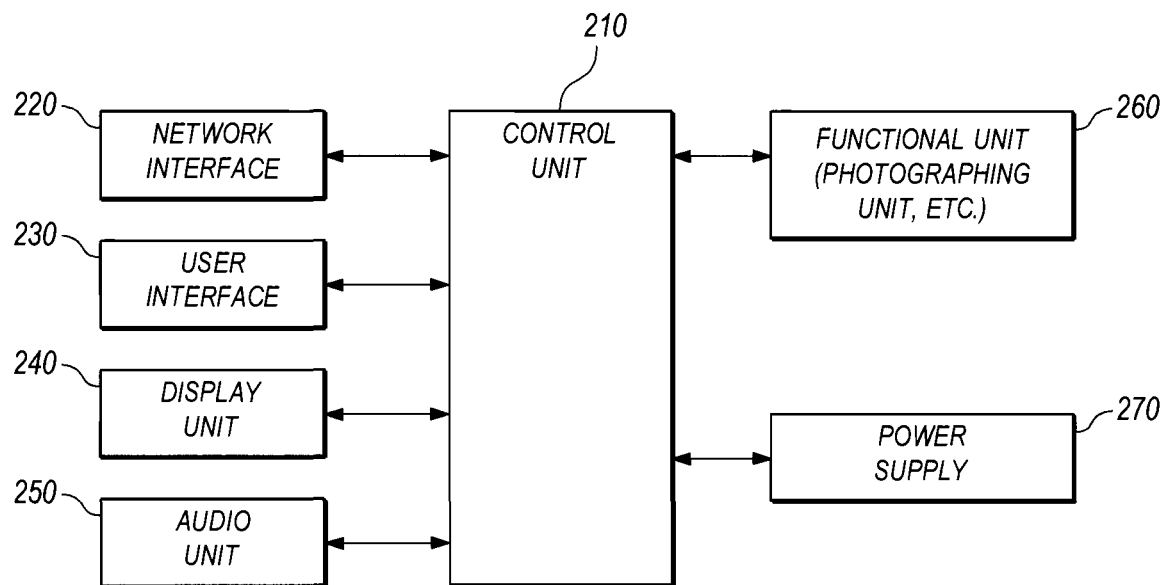
FIG. 2 is a diagram illustrating an electronic terminal according to an embodiment of the present inventive concept.

FIG. 2 illustrates a block diagram of an electronic terminal according to an embodiment of the present inventive concept. The terminal may include a control unit 210, a network interface 220, a user interface 230, a display unit 240, an audio unit 250, one or more functional unit 260, a power supply unit 270 including a battery and a battery charging unit. The above components may be disposed in or on a housing of the terminal.

The control unit 110 may control operations of the terminal and may include a data storage unit, for example, a semiconductor memory unit. The control unit 110 may be connected to an external data storage unit disposed in the housing. The housing of the terminal may include a port such that another external data storage can be detachably attached to the port of the housing, and the port may be connected to the control unit 110 to transmit and receive data.

The network interface unit 220 may communicate with an external network apparatus, for example, the AP 120, the device 130, and the station which are illustrated in FIG. 1.

The user interface unit 230 may receive a user input to control operations of the terminal. The user interface unit 230 may include a physical button or key board such as QWERTY keyboard. The user interface unit 230 may have a sensor to detect a user gesture as a user input. The user interface unit 230 may include a microphone to detect a user voice as a user input. The user interface unit 230 may be a sensor to detect an image as a user input. The display unit 240 may include a screen to display an image corresponding to operations of the terminal. The display unit 240 may include a panel or a touch screen to perform a function to display an image and also a function to receive a user input. The user interface unit 230 and the display unit 240 may be formed as a single integrated body. The audio unit 250 may be a speaker and/or a microphone.

The functional unit 260 may be a photographing unit to photograph an object and to generate a signal corresponding to the photographing object. The signal may be processed in the control unit 210, displayed in the display unit 240, and/or transmitted to the external apparatus through the network interface unit 220.

The power supply unit 270 may be connectable to an external power source using a wired and/or wireless method.

The control unit 210 is configured to selectively perform a security mode according to a condition set by a user when the terminal receives a user input corresponding to a power-on, an activation mode in response to a deactivation mode, a wake-up mode in response to a sleep mode, and/or a normal mode in response to a power-saving mode. The activation, wake-up, and normal mode may be usable as a common function of the terminal or may be usable differently, according to a design or user preference. The condition may be a safe zone condition in a security mode or may be a non-safe zone in a non-security mode, for example. After the condition is set in a normal mode of the terminal, the terminal is changed to the deactivation mode (the sleep mode or the power-saving mode) a predetermined time after the normal mode or a predetermined time after no user input. And then the terminal provides a process for the security mode or does not provide the process for the security mode according to the condition when being changed to the activation mode (wake-up mode or the normal mode) according to the user input.

FIGS. 3A-3D illustrating an electronic terminal 300 formed with a display unit and a user interface unit to display screens 300a-300d corresponding to operations of the electronic terminal 300 according to an embodiment of the present inventive concept.

Figure 3A:
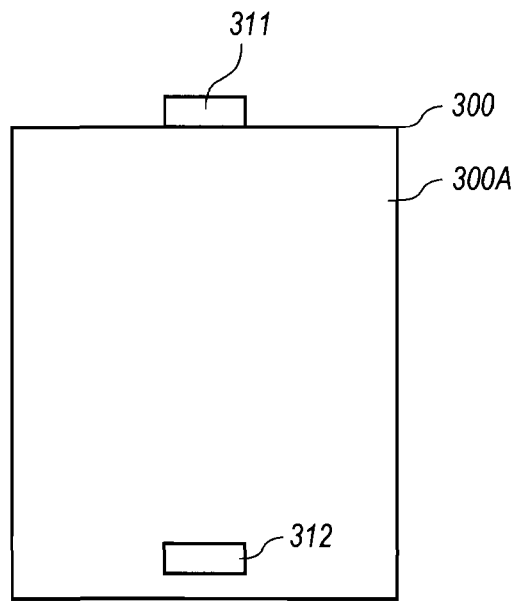
FIGS. 3A-3D are views illustrating an electronic terminal with a display unit and a user interface unit according to an embodiment of the present inventive concept.

As illustrated in FIG. 3A, the screen 300a of the terminal 300 A does not show an image according to a deactivation mode, a sleep mode, or a power saving mode. The terminal 300 may have a power switch 311 and a switch 312 as a user input. The power switch 311 may be usable to turn on and off the terminal, and the switch 312 may be usable to change a mode of the terminal 300, that is, to change from the deactivation mode, the sleep mode, or the power saving mode to an activation mode, a wake-up mode, or a normal mode. The switch 312 may be a sensor to detect a motion of the terminal 300 or to detect a motion (image) of a user as a user input.

Figure 3B:
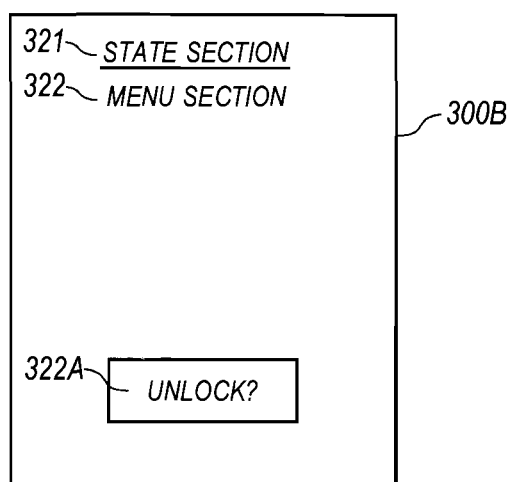

When the switch 312 of FIG. 3A is selected, the screen 300b of FIG. 3B may be displayed on a display unit to unlock or select a security process to access the terminal 300 in a security mode. The screen 300b may include a state section 321 and a menu section 322. The state section 321 may include a communication state with the AP 120, the device 130, and/or the station 321 of FIG. 1, and may also include other states corresponding to operations or functions set in the terminal 300 or environment around the terminal 300. The other states may include a time display or a battery state display, a temperature state display, a weather state display, etc. When the terminal 300 is in a power-on state, the terminal monitors, detects, determines, and/or performs communications with external devices to correspond to the above-described states of the state section 321.

Figure 3C:
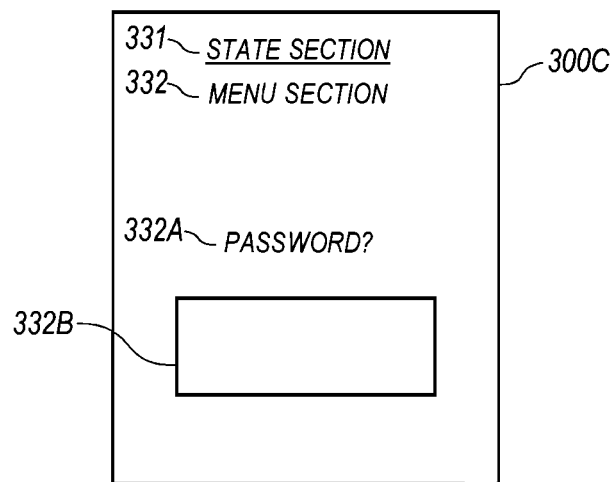
Figure 3D:
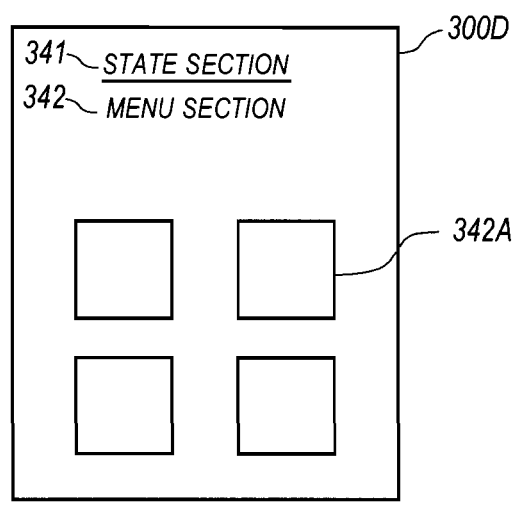

When a menu to unlock the terminal 300 is selected from the screen 300b, the screen 300c is displayed to show a security check process, for example, a password input process, as illustrated in FIG. 3C. The screen 300c may include a state section 331 and a menu section 332 having a password indication section 332a and a password input section 332b. When a password input by the user through the password input section 332b is identical to a password previously stored therein, the terminal 300 displays the screen 300d to show a state section 341 and a menu section 342 with menus (or icons) 342a.

When a first predetermined condition is set in the terminal 300 as a safe zone in a security mode (password setting mode), the screen 300a is change to the screen 300d without displaying the screens 300b and 300c when the first predetermined condition is met. When the first predetermined condition is not met, the terminal displays the screens 200b and 300c to require a security process to enter a password. When a second predetermined condition is set in the terminal 300 as a non-safe zone in a non-security mode (no password setting), the terminal displays the screens 300a, 300b, 300c, and 300d to normally access the terminal when the second predetermined condition is met. When the second predetermined condition is not met, the terminal 300 may not display the screens 300b and 300c.

The state section of the screen 300d may include an image corresponding to the safe zone and/or the non-safe zone according to the security mode and/or non-security mode, respectively. The state section may not be selectable by a user as a user input. The menu section 342 of the screen 300d may include one or more menus selectable by a user as a user input to perform a function or operation of the terminal 300. The menu section 342 of the screen 300d may include a settings menu (icon) to set the security mode, the non-security mode, the safe zone, and/or the non-safe zone, etc.

Figure 4:
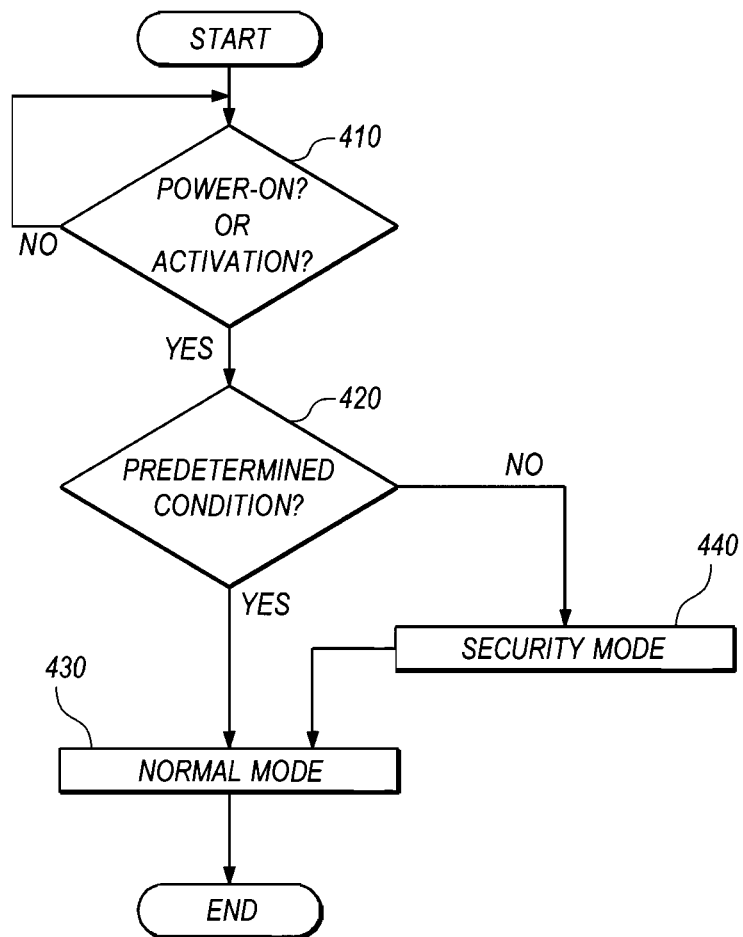
FIG. 4 is a flowchart illustrating a method of selectively applying a security process in a mobile device according to an embodiment of the present inventive concept.

FIG. 4 illustrates a method of selectively applying a security mode in a mobile device according to an embodiment of the present inventive concept.

A power-on or activation switch is on in operation 410, a control unit of the mobile device determines whether a predetermined condition is met in operation 420. When the predetermined condition is met, that is, the mobile device is in a safe zone, the mobile device operates a normal mode in operation 430 such that a user can access the mobile device. When the predetermined condition is not met in operation 420, that is, the mobile device is not in the safe zone, the mobile device requires a user to enter a password in operation 440 to authorize the user to access the mobile device.

Figure 5:
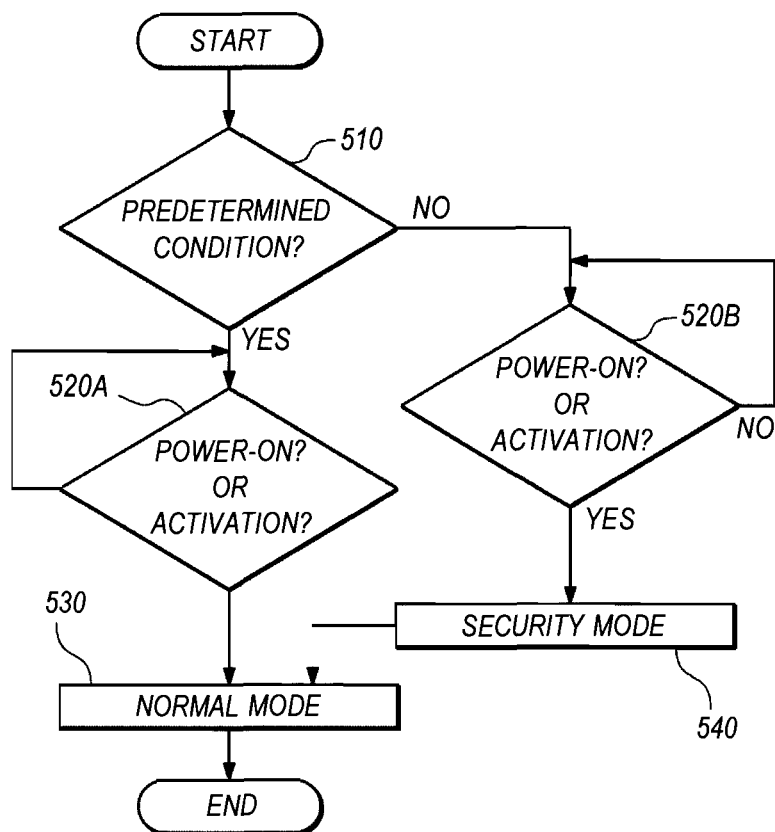
FIG. 5 is a flowchart illustrating a method of selectively applying a security process in a mobile device according to an embodiment of the present inventive concept.

FIG. 5 illustrates a method of selectively applying a security mode in a mobile device according to an embodiment of the present inventive concept A predetermined condition is set in the mobile device in operation 510. When an activation switch is selected in operations 520A or 520B, a security mode is not performed to enter a normal mode in operation 530 or the security mode is performed in operation 540 when the predetermined condition is not met in operation 510. That is, the mobile device selectively performs the security mode according to selection of an activation switch as a user input. The mobile device selectively requires a user to perform the security mode. For example, when the mobile device is in a safe zone according to the predetermined condition, the user is not required to process the security mode to enter a password. However, the mobile device is not in the safe zone according to the predetermined condition, the user is still required to process the security mode to enter a password. Here, the password may be a character, number, motion, audio, and/or image.

Figure 6A:
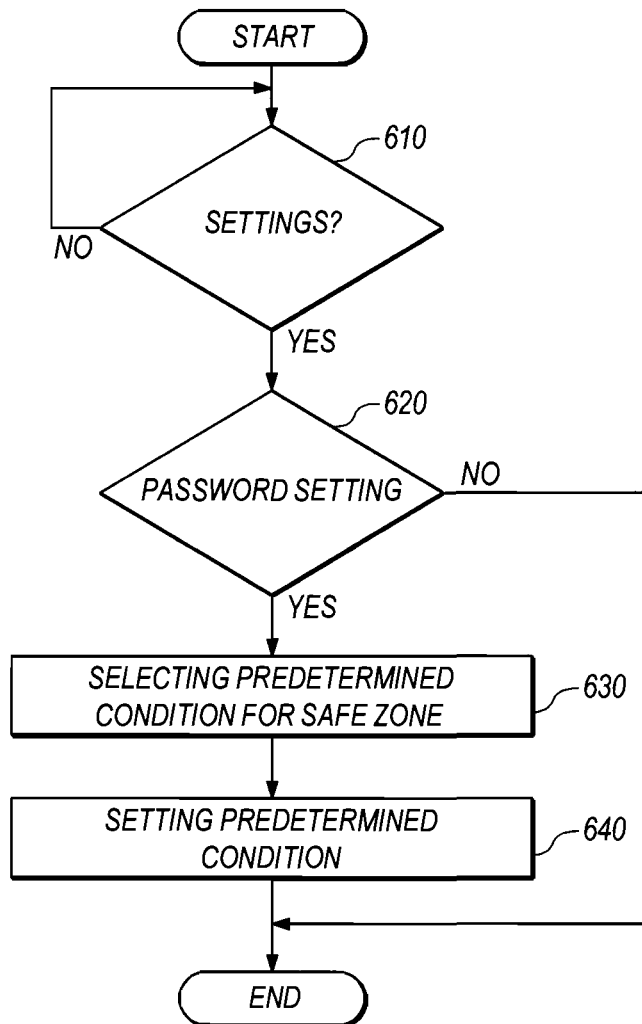
FIG. 6A is a flowchart illustrating a method of setting a condition for a safe zone in a password setting mode of a mobile device according to an embodiment of the present inventive concept.

FIG. 6A illustrates a method of setting a condition for a safe zone in a password setting mode of a mobile device according to an embodiment of the present inventive concept A user selects a settings menu in operation 610, and then selects a password setting menu in operation 620 to set the mobile device as a security (password setting) mode or a non-security (no-password setting) mode.

A predetermined condition for a safe zone is selected in operation 630, and then is set in operation 640.

Figure 6B:
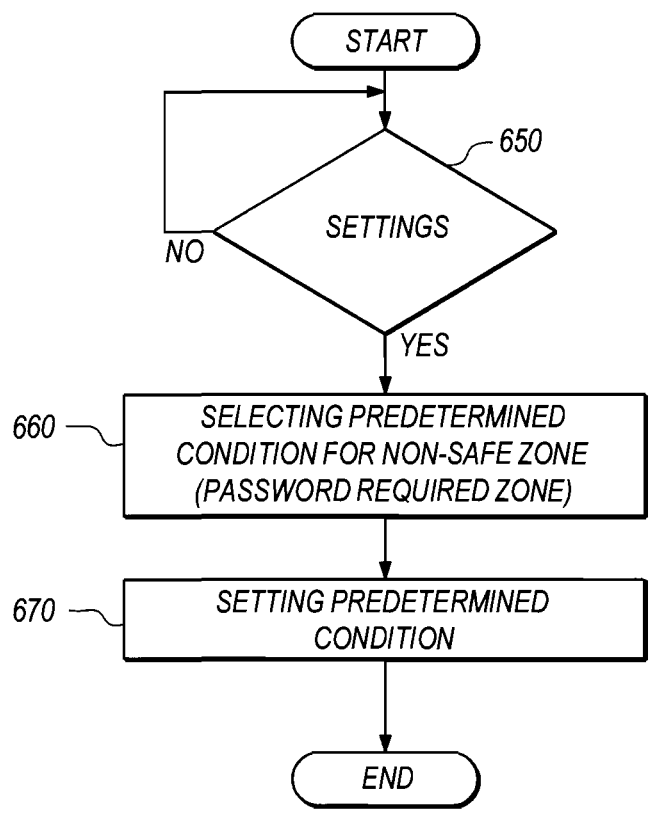
FIG. 6B is a flowchart illustrating a method of setting a condition for a non-safe zone in a non-password mode of a mobile device according to an embodiment of the present inventive concept.

FIG. 6B illustrates a method of setting a condition for a non-safe zone in a non-password mode of a mobile device according to an embodiment of the present inventive concept.

When a user selects a non-security (no-password setting) mode or does not set a security mode in the settings menu in operation 650, the settings menu may further include a menu to select a non-safe zone (or password-required zone) in operation 660. The predetermined condition can be set in operation 670 such that the mobile device monitors a current condition thereof to determine whether the current condition meets the predetermined condition. When the predetermined condition is met, the mobile device requires the user to enter a password to access the mobile device in the non-security mode of the mobile device. When the predetermined condition is not met, the mobile device does not require the user to enter the password in a similar manner to the non-security mode.

FIGS. 7A through 7I illustrate screens 700a through 7I of a mobile device to set a condition for a safe zone of a security mode or a non-safe zone of a non-security mode according to an embodiment of the present inventive concept.

Figure 7A:
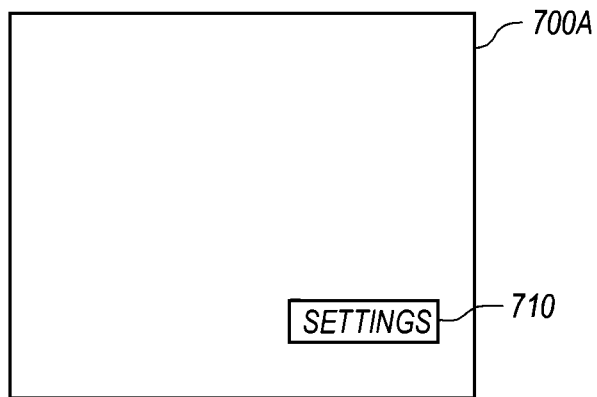
FIGS. 7A through 7I are views illustrating screens of a mobile device to set a condition in a mobile device according to an embodiment of the present inventive concept.
Figure 7B:
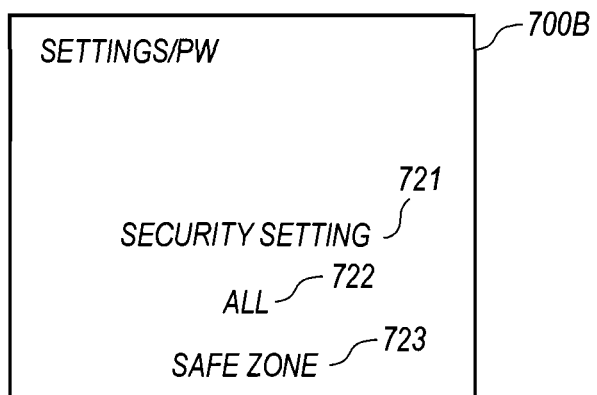
Figure 7C:
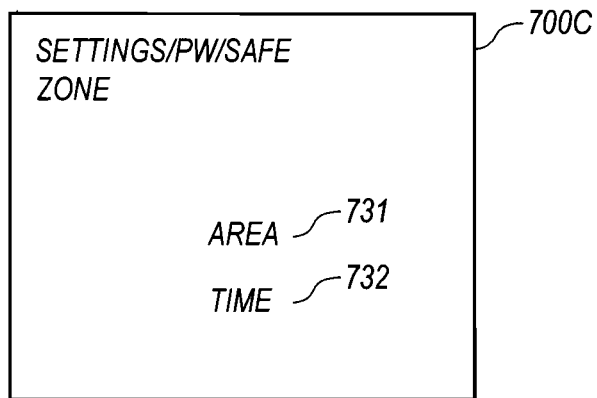

When a settings menu (button or icon) 710 is selected in the screen 700a of the mobile device as a user input in FIG. 7A, the screen 700b of FIG. 7B is displayed on a display unit and/or user input unit of the mobile device to show a selection of "security setting" 721 to set a security (password) as a security mode, a selection of "all" 722 to apply the security mode to all functions or operations of the mobile device, and a selection of a "safe zone" 723 to prevent the security mode in a predetermined condition. It is possible that the selection of "all" 722 and selection of "safe zone" 723 may be displayed in a separate screen from a screen of the security setting 721, that is, the selection of "all" 722 and selection of "safe zone" 723 may be displayed, performed, or selected independently after the security setting 721 is performed to set the security mode.

When a menu of the safe zone 723 is selected, the screen 700c is displayed to show an area menu 731 and/or a time menu 732 as the predetermined condition. It is possible that both the area menu 731 and the time menu 732 can be selected and set as the predetermined condition. It is also possible that only one of the area menu 731 and the time menu 732 can be selected and set as the predetermined condition.

When the time menu 732 is selected, a specific time or a time period is set as the safe zone, using a new screen. Setting a specific time or a time period is well known, detail descriptions thereof will be omitted. When the time menu is performed to set the predetermined condition of the safe zone, the mobile device releases the security mode at the specific time or during the time period such that the user can access the mobile device without the security process according to the set time menu.

Figure 7D:
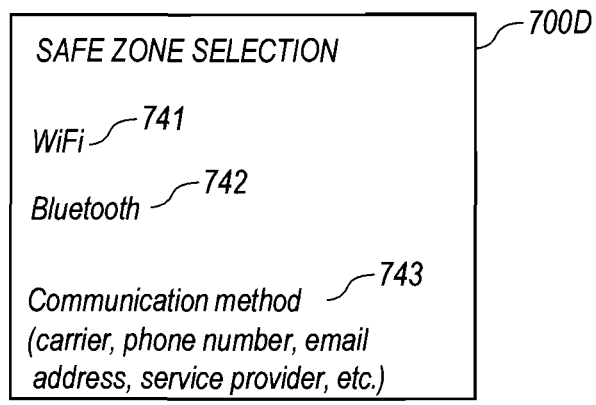

When the area menu 731 is selected, one or more area settings are displayed on the screen 700d of FIG. 7D. The one or more area settings may include a WiFi selection menu 741, a Bluetooth selection menu 742, and a communication method selection menu 743.

Figure 7E:
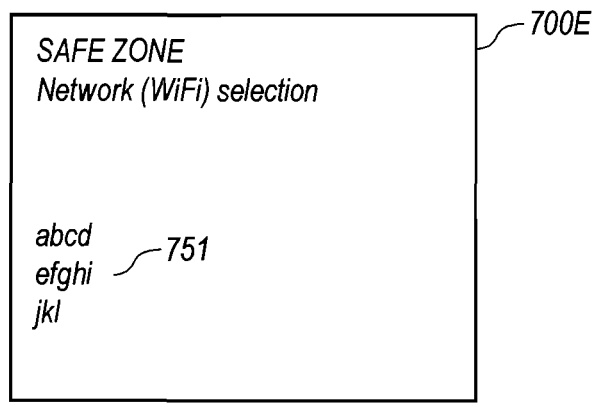

When the WiFi menu 741 is selected, at least one WiFi network 751 can be input, detected and then displayed, or selected as a safe zone in the screen 700e of FIG. 7E. When a user with a mobile device stays in a house of the user, for example, and an AP is located as a home use inside the house of the user, the AP as a home use may be reliable network and environment to the user and thus the home AP can be set as a safe zone. In this case, the user does not have to enter a password every time to activate or access the mobile device within an accessible area of the AP and/or inside the house. However, when a user with a mobile device stays away from the AP, the mobile device requires the user to enter the password since the predetermined condition is not met or the mobile device cannot communicate with the AP or lost a signal from the AP.

Figure 7F:
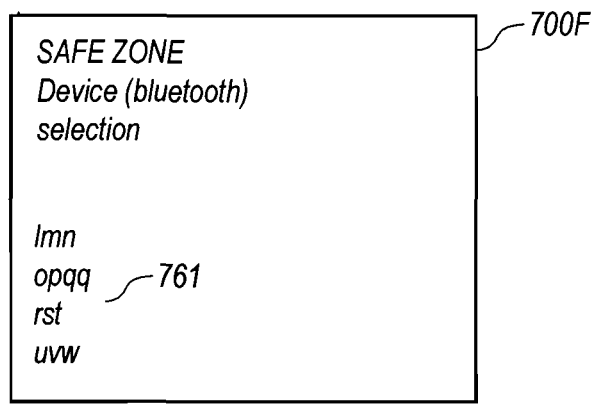

When the Bluetooth (device) is selected, at least one device 761 can be input, detected and then displayed, or selected as a safe zone in the screen 700f of FIG. 7F. When a user with a mobile device is in a vehicle owned by the user, for example, the Bluetooth and/or the vehicle may be reliable network and environment to the user and thus the device can be set as a safe zone. In this case, the user does not have to enter a password every time to activate or access the mobile device within an access area of the device, that is, within an inside of the vehicle.

It is possible that when a user vehicle is set as the device or the AP for the safe zone and when a signal indicating an emergence, for example, traffic collision or accident to the vehicle, is generated from the vehicle and then transmitted to the mobile device through the Bluetooth or WiFi, the mobile device can recognize the received signal as a predetermined condition of a safe zone so that the user can access and/or use the mobile device without entering a password in the security mode of the mobile device. Here, the vehicle and the mobile device are configured to recognize the signal as a portion of the predetermined condition of a safe zone. In this case, a combination of the selected device and a specific or predetermined signal from the selected device can be set as the safe zone of the mobile device, and when the mobile device receives the signal from the device, so that the user can access or use the mobile device without performing a security check process in a security mode of the mobile device.

It is also possible that when a user medical device is set as the device or the AP for the safe zone and when a signal indicating an emergence for example, a life threatening situation or accident to the user, is generated from the medical device and then transmitted to the mobile device through the Bluetooth or WIFi, the mobile device can recognize the received signal as a predetermined condition of a safe zone so that the user can access and/or use the mobile device without entering a password in the security mode of the mobile device. Here, the medical device and the mobile device are configured to recognize the signal as a portion of the predetermined condition of safe zone. In this case, a combination of the selected device and a specific or predetermined signal from the selected device can be set as a predetermined condition of the safe zone of the mobile device, and when the mobile device receives the signal from the device, so that the user can access or use the mobile device without performing a security check process in a security mode of the mobile device.

Figure 7G:
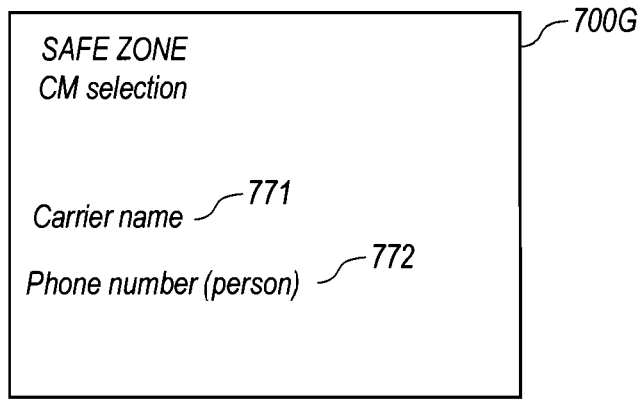

When the communication method 743 is selected, one or more communication methods (CMs) 771 and 772 can be selected and set as a safe zone on the screen 700g of FIG. 7G. In this case, a carrier name 771 and/or telephone number 772 can be reliable to the user. That is, when the user communicates with the person of the telephone number and the carrier name, the user does not have to enter a password to use the mobile device.

Figure 7H:
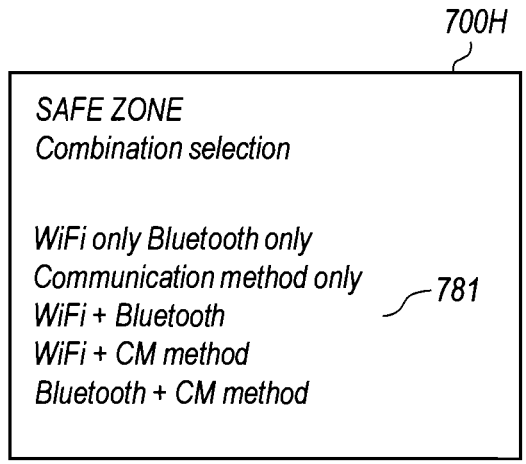
Figure 7I:
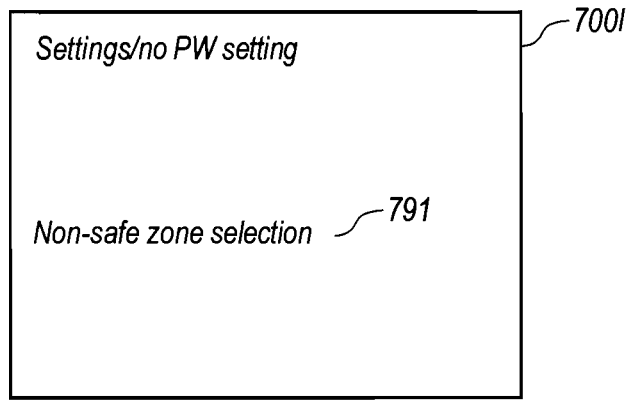

In the screen 700h of FIG. 7H, at least one or a combination of the Wifi, Bluetooth, and communication method can be selected and/or set in a menu 781 as safe zone.

When the security mode is not selected or set in the settings menu 710 of the screen 700a, a menu 791 of non-safe zone can be selected and set such that the mobile device is set to perform a security mode in a non-security mode of the mobile device. For example, an AP, a device, or a communication method is set as the non-safe zone using one or more non-safe zone selection processes similar to the safe zone selection processes of FIGS. 7D through 7H.

Figure 8A:
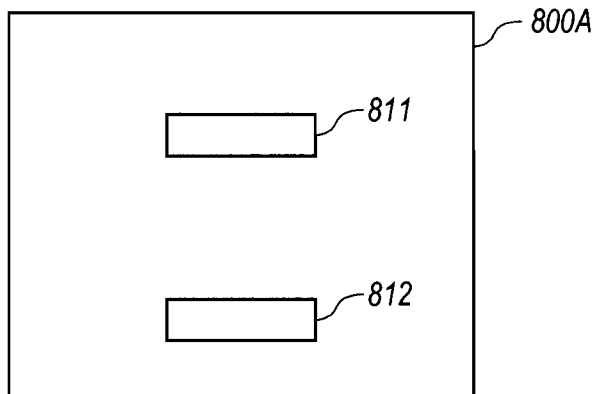
FIGS. 8A through 8F are views illustrating screens of a mobile device to perform operations in a safe zone and in a non-safe zone according to an embodiment of the present inventive concept.
Figure 8B:
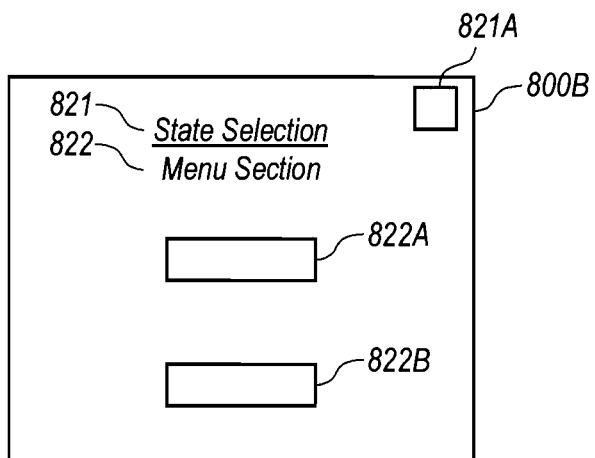
Figure 8C:
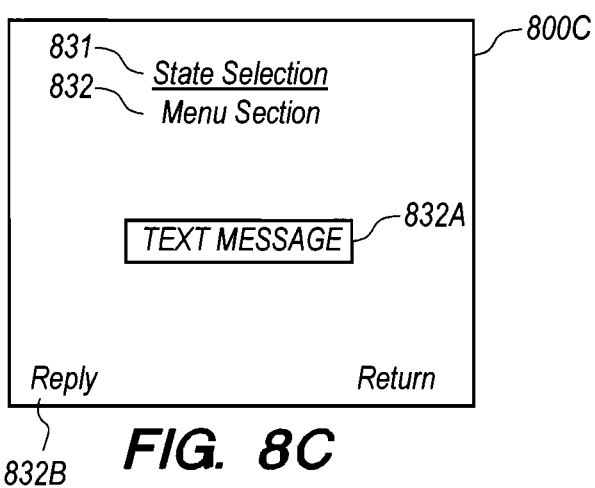
Figure 8D:
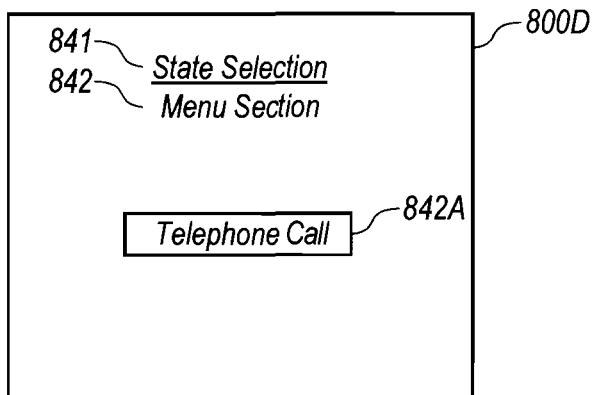

FIGS. 8A through 8F illustrate screens 800a through 800f of a mobile device to perform operations in a safe zone and in a non-safe zone according to an embodiment of the present inventive concept FIG. 8A illustrates the screen 800a, a power on/off switch 811, and an activation switch 812. FIG. 8B illustrates the screen 800b including a state section 821 and a menu section 822. The state section 821 may be similar to the state section 321, 331, and 341 of FIGS. 3B, 3C and 3D. The state section 821 may include a state indicator 821a to indicate a predetermined state and/or a safe zone in a security mode. The states displayed on the state section 821 may not be selectable by a user as a user input. The menu section 822 may include one or more menus 822a and 822n which are displayable on a display unit and/or selectable by a user as a user input.

When a current condition matches the predetermined condition as the safe zone, the mobile device displays the screen 800b by skipping a security mode process. It is possible that the mobile device can display on the screen 800c with a state section 831 and a menu section 832 including a test message 832a and selection menus 832 b relating to the displayed text 832a when the mobile device receives the test message. It is also possible that the mobile device can display on the screen 800d with a state section 841 and a menu 4 including a telephone call message 842a including selection menus relating to the telephone call message 842a when the mobile device receives the telephone call such that the user can access and use the mobile device.

Figure 8E:
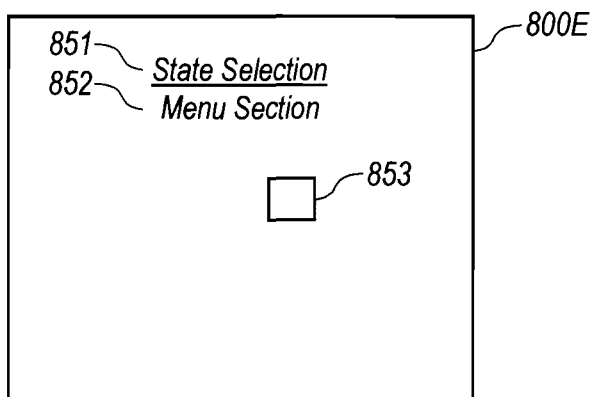
Figure 8F:
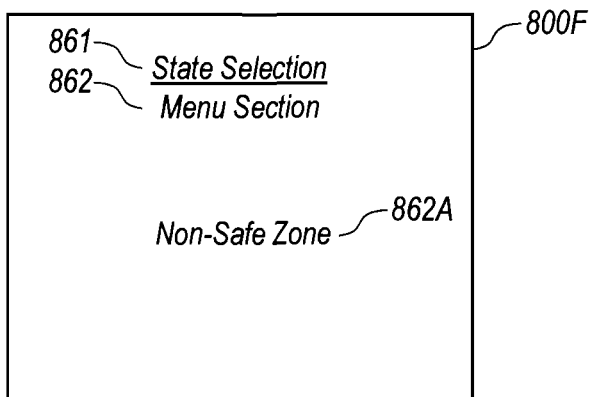

The screen 800e of FIG. 8E illustrates a state section 851 and a menu section 852 including at least one menu 852. The screen 800e may be displayed when a password is entered in a security (password-setting) mode, when a predetermined condition of a safe zone is met in the security mode, or when a password is entered in a non-security mode and in a non-safe zone. The menu 852 may be a settings menu to select, change, or modify settings of the mobile device. In this case, it is possible that the mobile device may require the user to enter a password to select, change, or modify settings when the screen 8003 is displayed when a predetermined condition of a safe zone is met in the security mode and accordingly a security mode is not preformed.

Figure 9:
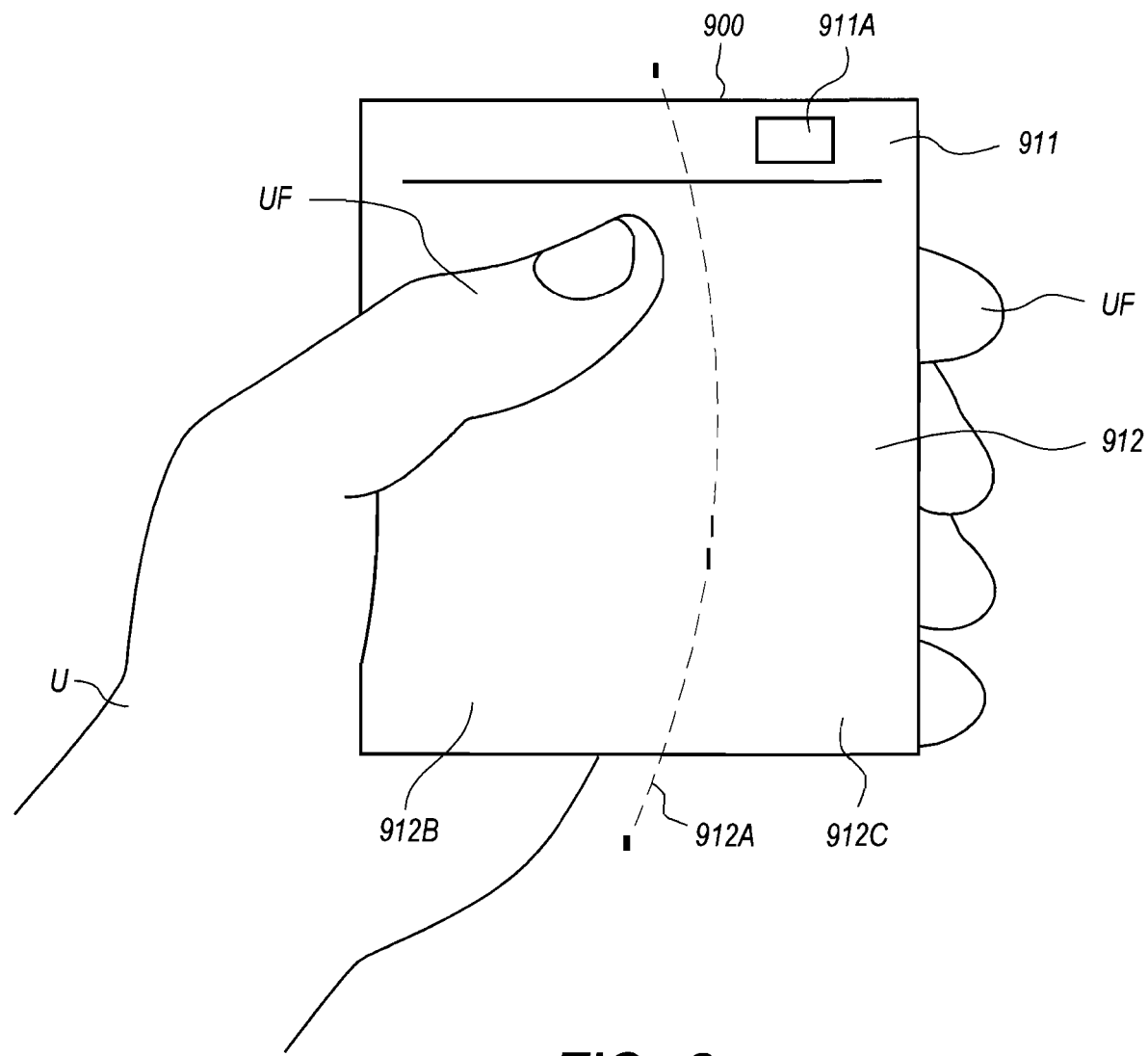
FIG. 9 is a view illustrating a mobile device to display a user input menu within a user finger-reaching area according to an embodiment of the present inventive concept.

FIG. 9 illustrates a mobile device 900 to display a state section 911 and a user menu section 912 according to an embodiment of the present general inventive concept. A user U holds the mobile device 900 using one hand. At least one of user fingers UF of the user one hand can be usable to select a menu to input a user input. The user menu section 912 may include a user menu area 912b and a non-user menu area 912c which are defined by a line to be a user-finger reachable area and a user-finger unreachable area, respectively. One or more menus or images displayed within the user menu area can be selectable by a user using a finger without assistance of the other hand finger, and one or more menus or images displayed within the non-user menu area 912c may not be reachable selectable by the user using the same finger. It is possible that the non-user menu area 912c may not include a menu to be selectable by a user as a user input. Accordingly, a user can control the mobile device with one hand.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a read-only memory (ROM), a random-access memory (RAM), a flash memory, a semiconductor chip package, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As illustrated above, a mobile device can be set in a security mode and a safe zone may be set in the security mode so that the mobile device does not require a user to enter a password when a current condition matches a pre-determined condition of the safe zone.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A non-transitory computer-readable medium containing computer-readable codes as a program to execute a method of a mobile device which is configured to photograph an object, to display a screen on a panel of a display unit, and to control an interface to receive an input from a user and to wirelessly communicate with an external network to transmit or receive a data signal corresponding to a menu or function of the mobile device, the method comprising:
receiving a user input to change the mobile device from a power saving mode to a normal mode;
unlocking the mobile device for the user to access the normal mode from the power saving mode according to a password input from the user in a security check process of a security mode, and the user input;
displaying a user menu during the normal mode for the user to set an exceptional condition which comprises an area condition, in which the mobile device is located, and a wireless communication condition, in which the mobile device wirelessly communicates with the external network; and
unlocking the mobile device for the user to access the normal mode from the power saving mode according to the exceptional condition of the security mode and the user input.

2. The medium of claim 1, wherein the method further comprises:
determining whether the mobile device is in the exceptional condition;
unlocking the mobile device without the password according to the determination that the mobile device is in the exceptional condition; and
unlocking the mobile device by using the password of the security check process according to the determination that the mobile device is not in the exceptional condition.

3. The medium of claim 1, wherein the mobile device is not in the exceptional condition when the mobile device is not in an area of the area condition and when the mobile device is not in an accessible area of the external network of the wireless communication condition.

4. The medium of claim 1, wherein the method further comprises:
receiving a user input according to an operation of a switch of the interface; and
changing the mobile device to the normal mode according to the user input.

5. The medium of claim 1, wherein the method further comprises displaying a user menu to set the password of the security check process of the security mode during the normal mode, at a user-finger reachable area of the panel of the display unit such that a finger of a user hand holding the mobile device reaches the user menu.

6. The medium of claim 1, wherein the method further comprises displaying a user menu to set the exceptional condition of the security mode during the normal mode, at a user-finger reachable area of the panel of the display unit such that a finger of a user hand holding the mobile device reaches the user menu.

7. The medium of claim 1, wherein the method further comprises:
displaying a first sub-user menu to set the wireless communication condition and a second sub-user menu to set the area condition; and
disposing at least one of the first sub-user menu and the second sub-user menu, at a user-finger reachable area of the panel of the display unit such that a finger of a user hand holding the mobile device reaches the at least one of the first sub-user menu and the second sub-user menu.

8. The medium of claim 1, wherein the method further comprises:
displaying a state section and a user menu section on the panel of the display unit;
displaying a user menu to set at least a portion of the exceptional condition in the user menu section; and
disposing the user menu at a user-finger reachable area of the user menu section on the panel of the display unit such that a finger of a user hand holding the mobile device reaches the user menu.

9. The medium of claim 1, wherein the method further comprises changing the mobile device to the normal mode according to at least one of an operation of a switch of the mobile device, the password of the security check process of the security mode, and the exceptional condition of the security mode.

10. The medium of claim 1, wherein the area condition is associated with the data signal of the external network, and the method further comprises determining that the mobile device is in an area of the area condition by using the data signal of the external network of the wireless communication condition.

11. The medium of claim 1, wherein the external network comprises a home appliance including a WiFi device which is located in an area of the area condition.

12. The medium of claim 1, wherein the external network comprises a wireless device connected to one of a wired external network and a mobile network.

13. The medium of claim 1, wherein the method further comprises controlling the display unit to display a user menu to set an area of the area condition when the mobile device communicates with the external network according to the wireless communication condition.

14. The medium of claim 1, wherein the method further comprises:
displaying at least one of a line or an environment to define an area of the area condition, in which the mobile device is located, on a diagram.

15. The medium of claim 1, wherein the method further comprises requiring the password input by user to change an area of the area condition during the normal mode.

16. The medium of claim 1, wherein the method further comprises requiring the wireless communication condition to set an area of the area condition, and the area of the area condition is not same as an accessible area of the external network of the wireless communication condition.

17. The medium of claim 1, wherein the external network comprises a refrigerator having a WIFi device.

18. The medium of claim 1, wherein the external network comprises at least one network of a mobile carrier service station network and a WIFI device connected to a wired external network.

19. The medium of claim 1, wherein the method further comprises:
displaying a plurality of detected external networks on the panel of the display unit; and
selecting at least one of the displayed plurality of detected external networks to set as the external network of the wireless communication condition.

20. The medium of claim 1, wherein:
the exceptional condition further comprises a time condition, in which the mobile device is at a predetermined time, and a signal condition in which the mobile device receives a predetermined signal; and
the method further comprises unlocking the mobile device according to the password or according to the wireless communication condition and at least one of the area condition, the time condition, and the signal condition.

21. The medium of claim 1, wherein:
the external network comprises a wireless device connected to a network; and
a location of the wireless device is distanced from a line defining an area of the area condition.

22. The medium of claim 1, wherein:
the external network comprises a mobile carrier service station; and
a location of the mobile carrier service station is distanced from a line defining an area of the area condition.

23. The medium of claim 1, wherein:
the external network comprises a wireless device disposed in an area of the area condition; and
the area of the area condition is not same as a wireless communication of the wireless device.

24. The medium of claim 1, wherein:
the external network comprises a WiFi device connected to a wired external network and wirelessly communicating with the mobile device; and
a location of the WiFi device is different a center area of the area condition.

25. The medium of claim 1, wherein:
the external network comprises a mobile carrier service station wirelessly communicating with the mobile device; and
a location of the mobile carrier service station is not within an area of the area condition.

26. The medium of claim 1, wherein the method further comprises:
determining that the mobile device is not in the exceptional condition when the mobile device is not located in an area of the area condition; and
unlocking the mobile device by using the password according to the determination.

27. The medium of claim 1, wherein the method further comprises:
determining that the mobile device is not in the exceptional condition when the mobile device does not communicate with the external network; and
unlocking the mobile device by using the password according to the determination.

28. The medium of claim 1, wherein the method further comprises:
determining that the mobile device is in the exceptional condition when the mobile device communicates with the external network and when the mobile device is within an area of the area condition; and
unlocking the mobile device according to the determination.

29. The medium of claim 1, wherein:
the method further comprises receiving the user input to change the mobile device from the power saving mode to the normal mode; and
the unlocking the mobile device further comprises unlocking the mobile device for the user to access the normal mode according to the exceptional condition, in response to the user input.

30. The medium of claim 1, wherein:
the mobile device comprises a switch to generate the user input during the power saving mode; and
the unlocking the mobile device further comprises unlocking the mobile device for the user to access the normal mode according to the exceptional condition, in response to an operation of the switch.

31. The medium of claim 1, wherein:
the mobile device comprises a sensor to generate the user input during the power saving mode; and
the unlocking the mobile device further comprises unlocking the mobile device for the user to access the normal mode according to the exceptional condition, in response to an operation of the sensor.

32. The medium of claim 1, wherein:
the method further comprises detecting a motion of the mobile device as the user input during the power saving mode; and
the unlocking the mobile device further comprises unlocking the mobile device for the user to access the normal mode according to the detected motion, the wireless communication condition, and at least one of the area condition, a time condition, and a signal condition.

33. The medium of claim 1, wherein:
the method further comprises detecting a motion of the user as the user input during the power saving mode; and
the unlocking the mobile device further comprises unlocking the mobile device for the user to access the normal mode according to the detected motion, the wireless communication condition, and at least one of the area condition, a time condition, and a signal condition.

34. The medium of claim 1, wherein:
the method further comprises detecting an image of the user as the user input during the power saving mode; and
the unlocking the mobile device further comprises unlocking the mobile device for the user to access the normal mode according to the detected image, the wireless communication condition, and at least one of the area condition, a time condition, and a signal condition.

* * * * *